(12) United States Patent
Gao

(10) Patent No.: US 10,708,495 B2
(45) Date of Patent: Jul. 7, 2020

(54) UNIVERSAL POLICE LOUDSPEAKER

(71) Applicant: Ningbo Kaishuo Lighting Technology Co., Ltd., Zhejiang (CN)

(72) Inventor: Yanhua Gao, Zhejiang (CN)

(73) Assignee: YUYAO HENGZHENG METAL WARE CO., LTD. (CN)

( * ) Notice: Subject to any disclaimer, the term of this patent is extended or adjusted under 35 U.S.C. 154(b) by 0 days.

(21) Appl. No.: 16/469,467

(22) PCT Filed: Jun. 30, 2017

(86) PCT No.: PCT/CN2017/091152
§ 371 (c)(1),
(2) Date: Jun. 13, 2019

(87) PCT Pub. No.: WO2018/223459
PCT Pub. Date: Dec. 13, 2018

(65) Prior Publication Data
US 2020/0112676 A1  Apr. 9, 2020

(30) Foreign Application Priority Data

Jun. 6, 2017  (CN) .......................... 2017 1 0419083

(51) Int. Cl.
*H04N 5/232* (2006.01)
*H04N 5/225* (2006.01)
(Continued)

(52) U.S. Cl.
CPC ........... *H04N 5/23238* (2013.01); *F41H 9/00* (2013.01); *G06K 9/00288* (2013.01);
(Continued)

(58) Field of Classification Search
CPC .. H04N 5/23238; H04N 5/2253; H04N 5/247; G06T 7/50; G06T 7/70;
(Continued)

(56) References Cited

U.S. PATENT DOCUMENTS

| 2005/0152573 A1* | 7/2005 | Suzuki | H04R 9/025 |
| | | | 381/412 |
| 2007/0154054 A1* | 7/2007 | Hayasaka | H04R 1/025 |
| | | | 381/386 |
| 2018/0035049 A1* | 2/2018 | Hussain | H04N 7/147 |

FOREIGN PATENT DOCUMENTS

| CN | 2264456 Y | 10/1997 |
| CN | 201063836 Y | 5/2008 |

(Continued)

OTHER PUBLICATIONS

International Search Report for PCT/CN2017/091152 dated Feb. 13, 2018.—No translation provided.
(Continued)

*Primary Examiner* — Alexander Gee
(74) *Attorney, Agent, or Firm* — Tarolli, Sundheim & Tummino, LLP

(57) ABSTRACT

A universal police speaker includes an inner cavity, a voice coil, a magnet, a support plate, a diaphragm and a protecting cover to form a dome speaker structure. The inner cavity is filled with a sound absorbing material; the voice coil is installed around the inner cavity; the magnet is installed around the voice coil; the support plate is installed between the voice coil and the magnet; the diaphragm is installed at the top of the inner cavity; and the protecting cover is installed at the diaphragm. The speaker further includes a level bracket for placing the inner cavity, the voice coil, the magnet, the support plate, the diaphragm and the protecting cover, and the level bracket is disposed at the top of a car body of a police car. The invention can improve the anti-violence capability of the police speaker.

5 Claims, 1 Drawing Sheet

(51) Int. Cl.
| | | |
|---|---|---|
| *G06T 7/70* | (2017.01) | |
| *H04R 9/02* | (2006.01) | |
| *G06T 5/00* | (2006.01) | |
| *H04R 1/02* | (2006.01) | |
| *G06K 9/00* | (2006.01) | |
| *F41H 9/00* | (2006.01) | |
| *H04N 5/247* | (2006.01) | |
| *H04R 7/12* | (2006.01) | |
| *H04R 9/06* | (2006.01) | |
| *G06T 7/50* | (2017.01) | |

(52) U.S. Cl.
CPC ................ *G06T 5/007* (2013.01); *G06T 7/50* (2017.01); *G06T 7/70* (2017.01); *H04N 5/2253* (2013.01); *H04N 5/247* (2013.01); *H04R 1/025* (2013.01); *H04R 1/026* (2013.01); *H04R 7/127* (2013.01); *H04R 9/025* (2013.01); *H04R 9/06* (2013.01); *G06T 2207/10028* (2013.01); *G06T 2207/30196* (2013.01)

(58) Field of Classification Search
CPC ........... G06T 5/007; G06T 2207/10028; G06T 2207/30196; G06T 2207/30323; G06T 7/74; F41H 9/00; G06K 9/00288; G06K 9/00771; G06K 9/00791; H04R 1/025; H04R 1/026; H04R 7/127; H04R 9/025; H04R 9/06; G08B 13/19617
See application file for complete search history.

(56) References Cited

FOREIGN PATENT DOCUMENTS

| | | |
|---|---|---|
| CN | 101435541 A | 5/2009 |
| CN | 202463689 U | 10/2012 |
| CN | 205945930 U | 2/2017 |
| CN | 106514677 A | 3/2017 |
| EP | 0610001 A2 | 8/1994 |

OTHER PUBLICATIONS

International Written Opinion for PCT/CN2017/091152 dated Feb. 13, 2018.—No translation provided.

* cited by examiner

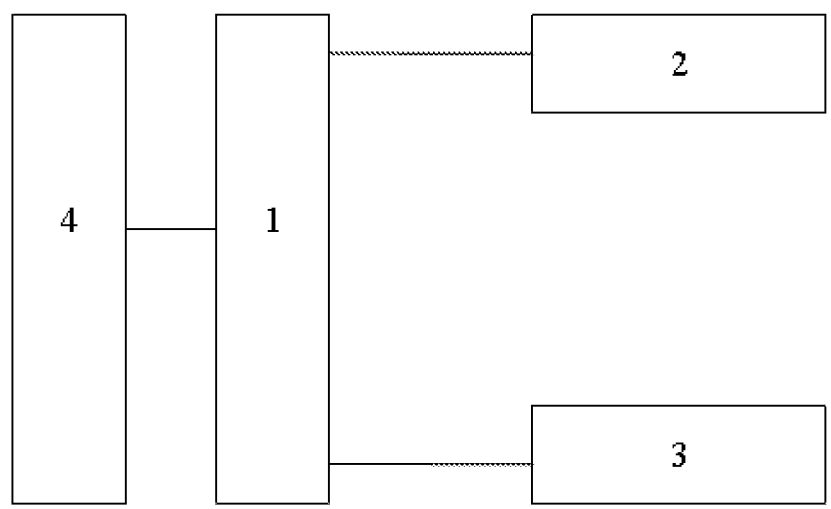

UNIVERSAL POLICE LOUDSPEAKER

RELATED APPLICATIONS

The present invention is a U.S. National Stage under 35 USC 371 patent application, claiming priority to Serial No. PCT/CN2017/091152, filed on 30 Jun. 2017; which claims priority of CN 201710419083.1, filed on 6 Jun. 2017, the entirety of both of which are incorporated herein by reference.

FIELD OF THE INVENTION

The present invention relates to the field of speakers, and more particularly to a universal police speaker.

BACKGROUND OF THE INVENTION

There are various different types of speakers: Paper cones have the advantages of natural tones, low price, good rigidity, lightweight material, and high sensitivity and the disadvantages of poor moisture resistance, high level of difficulty of controlling the consistence of the manufacture, but the paper cones are very common in high-end HiFi systems, since the output of sound is uniform, and the reversibility is good.

Bulletproof fabric cone has the features of wide frequency response and low distortion, and thus it is the first choice for strong bass lovers, and its disadvantages include high cost, complicated manufacturing process, insufficient sensitivity, and poor effect of light music. Wool knit cone has the features of soft texture, and thus provides excellent performance for soft music and light music and the disadvantages of poor bass effect and lack of strength and shocking power.

Polypropylene (PP) cone is popular in high-end speakers and has the features of good consistency, low distortion, and remarkable performance in all aspects. In addition, there are fiber diaphragms and composite diaphragms, and they are expensive and thus are seldom used in common speakers.

The conventional police speaker cannot be used in police work sufficiently and is just limited to the function of providing the siren and a deterrent effect. With the limited manpower of police officers, it is necessary to use the present existing hardware resources to provide more auxiliary police functions, and the conventional police speaker still cannot provide the aforementioned function.

SUMMARY OF THE INVENTION

Therefore, it is a primary objective of the present invention to overcome the aforementioned drawbacks of the prior art by providing a universal police speaker, wherein a face recognition of a human sub-image is carried out to obtain a target face characteristic, and the target face characteristic is matched with each criminal face image characteristic, and if there is a match, then an identification success signal will be issued, and a criminal's name corresponding to the criminal face image characteristic will be outputted, and the spraying direction will be determined based on a relative position of the final human sub-image in the differentiated image when the identification success signal is received, and the spray driving device will be turned on and the spraying direction will be sent to the pepper spray device, and an instant distance corresponding to a human target from the speaker based on the depth of view of the human sub-image corresponding to the human sub-image in the human target, and the spray intensity sent to the pepper spray device will be adjusted according to the instant distance.

To achieve the aforementioned and other objectives, the present invention provides a universal police speaker comprising an inner cavity, a voice coil, a magnet, a support plate, a diaphragm and a protecting cover to form a dome speaker structure, characterized in that the inner cavity is filled with a sound absorbing material; the voice coil is installed around the inner cavity; the magnet is installed around the voice coil; the support plate is installed between the voice coil and the magnet; the diaphragm is installed at the top of the inner cavity; and the protecting cover is installed at the diaphragm; wherein the speaker further comprises a level bracket, for placing the inner cavity, the voice coil, the magnet, the support plate, the diaphragm and the protecting cover; and the level bracket is disposed at the top of a car body of a police car.

The universal police speaker further comprises an image capturing device installed on the level bracket for performing an image data collection of the surrounding of the police car to obtain a high-definition panoramic image.

In the universal police speaker, the image capturing device comprises four image sensors embedded around the level bracket for splicing the images outputted from the four image sensors to obtain the high-definition panoramic image.

The universal police speaker further comprises a master control device installed in the level bracket and coupled to the dome speaker structure and the image capturing device for controlling the dome speaker structure based on the content outputted by the image capturing device.

The universal police speaker further comprises:

a pepper spray, stored in the police car, for performing a fixed-direction spray; a contrast enhancement device, coupled to the image capturing device, for receiving the high-definition panoramic image, and performing a contrast enhancement processing of the high-definition panoramic image to obtain an enhanced image;

a Wiener filtering device, coupled to the contrast enhancement device, for receiving the enhanced image, and executing a Wiener filtering of the enhanced image to obtain a filtered image;

an area detection device, coupled to the filtered image, for executing a human target detection of the filtered image based on a predetermined human characteristic to obtain each human sub-image, determining a pixel area of each human sub-image, determining an area percentage of each target based on the pixel area of each target and the total pixel area of the filtered image;

a depth-of-view detection device, coupled to the area detection device, for determining the depth of view of each target corresponding to each respective human sub-image in the filtered image, and determining the physical area of each target based on the area percentage and the depth of view of each target;

an image initial screening device, coupled to the depth-of-view detection device, for screening each target with a physical area smaller than or equal to a first area threshold in the filtered image to obtain an initially screened image;

an image re-screening device, coupled to the depth-of-view detection device, for screening each target with a physical area smaller than or equal to a second area threshold in the filtered image to obtain a re-screened image; wherein the second area threshold is greater than the first area threshold;

a target capturing device, coupled to the image initial screening device and the image re-screening device, for subtracting the initially screened image from the re-screened image to obtain a differentiated image, and outputting the human sub-image corresponding to the remaining target of the differentiated image as a final human sub-image;

a target analysis device, coupled to the target capturing device, for receiving the final human sub-image, and performing a face recognition of the final human sub-image to obtain a target face characteristic, and matching the target face characteristic with each criminal face image characteristic, wherein if there is a match, then an identification success signal will be issued, and a criminal's name corresponding to the matched criminal face image characteristic will be outputted, and the spraying direction will be determined based on a relative position of the differentiated image of the final human sub-image; and if there is no match at all, then an identification failure signal will be issued;

wherein, the master control device is coupled to the target analysis device and the pepper spray device for turning on the spray driving device and sending the spraying direction to the pepper spray device when receiving the identification success signal, and for turning off the pepper spray device when receiving the identification failure signal.

Wherein, the master control device is further provided for determining the instant distance of the human target corresponding to the final human sub-image from the speaker based on the depth of view of the final human sub-image corresponding to the human target in the differentiated image and adjusting the spray intensity sent to the pepper spray device according to the instant distance, when the identification success signal is received.

The universal police speaker further comprises an instant display device installed in a front-end dashboard of a police car and coupled to the master control device for instantly displaying the spraying direction and the instant distance.

In the universal police speaker, the instant display device is further used for instantly displaying text information corresponding to the identification success signal or the identification failure signal.

The universal police speaker further comprises a spray head coupled to the pepper spray device for adjusting the spraying direction of the pepper spray device.

BRIEF DESCRIPTION OF THE DRAWING

FIG. 1 is a structural block diagram of a universal police speaker in accordance with an embodiment of the present invention.

DESCRIPTION OF THE PREFERRED EMBODIMENTS

The technical contents of the present invention will become apparent with the detailed description of preferred embodiments accompanied with the illustration of related drawings as follows. It is intended that the embodiments and figures disclosed herein are to be considered illustrative rather than restrictive.

There are various different types of speakers, which may be divided into electronic speakers (i.e. moving coil speakers), electrostatic speakers (i.e. capacitive speakers), electromagnetic speakers (i.e. reed type speakers) and piezoelectric speakers (i.e. transistor type speaker) according to the transduction principle, and the last two types of speakers described above are generally used in rural cable broadcasting networks. Speakers may also be divided into low-frequency speakers, mid-frequency speakers, and high-frequency speakers according to the frequency range, and these speakers are often used as a combination speaker in a speaker box.

According to the mechanism and structure of the transduction, speakers may be divided into moving coil speakers (electronic type), capacitive speakers (electrostatic type), piezoelectric speakers (transistor or ceramic type), electromagnetic speakers (compression spring type), electro-ionic speakers, and pneumatic speakers. The electric speakers with the advantages of good electroacoustic performance, firm structure and low cost have a wide range of application.

According to the sound radiation material, speakers may be divided into paper cones, horns, and diaphragms. According to the shape of paper cone, speakers may be divided into circular, elliptical, double paper-cone and rubber corrugated rim speakers. According to the operating frequency, speakers may be divided into low-frequency, mid-frequency, and high-frequency speakers, and some are divided into speakers specified for the use for answering machines, televisions, regular and high-fidelity speakers. According to the voice coil impedance, speakers may be divided into low-impedance and high-impedance speakers. According to the sound effect, speakers may be divided into straight and surround sound speakers.

Speakers may also be divided into built-in speakers and external speakers, wherein the external speaker generally refers to a speaker box, and the built-in speaker generally refers to a speaker built into a MP4 player, so that users not just can listen to the sound played from the MP4 player through a headset only, but also through a built-in speaker. Therefore, a MP4 player having a built-in speaker no longer needs an external speaker box, and avoid the inconvenience caused by wearing the headset for a long time.

The present existing speakers only have a single function and cannot timely identify and prompt a criminal nearby, not mentioning its use for capturing or arresting criminals. To overcome the aforementioned deficiencies, the present invention provides a universal police speaker integrated with the function of spraying a pepper spray in a fixed-direction to overcome the aforementioned deficiencies of the prior art.

With reference to FIG. 1 for a structural block diagram of a universal police speaker in accordance with an embodiment of the present invention, the universal police speaker comprises an inner cavity, a voice coil, a magnet, a support plate, a diaphragm and a protecting cover to form a dome speaker structure, and the inner cavity is filled with a sound absorbing material; the voice coil is installed around the inner cavity; the magnet is installed around the voice coil; the support plate is installed between the voice coil and the magnet; the diaphragm is installed at the top of the inner cavity; and the protecting cover is installed at the diaphragm;

wherein, the speaker further comprises a level bracket, a playing mode switcher and a manual power switcher, and the playing mode switcher is controlled manually, and the level bracket is provided for placing the inner cavity, the voice coil, the magnet, the support plate, the diaphragm and the protecting cover, and the level bracket is disposed at the top of a car body of a police car.

The specific structure of the universal police speaker of the present invention will be described in details below.

The police speaker further comprises an image capturing device installed on the level bracket for performing an image data collection of the surrounding of the police car to obtain a high-definition panoramic image.

In the police speaker, the image capturing device comprises four image sensors embedded around the level bracket for splicing the images outputted from the four image sensors to obtain the high-definition panoramic image.

The police speaker further comprises a master control device installed in the level bracket and coupled to the dome speaker structure and the image capturing device for controlling the dome speaker structure based on the content outputted by the image capturing device.

The police speaker further comprises:

a pepper spray, stored in the police car, for performing a fixed-direction spray; a contrast enhancement device, coupled to the image capturing device, for receiving the high-definition panoramic image, and performing a contrast enhancement processing of the high-definition panoramic image to obtain an enhanced image;

a Wiener filtering device, coupled to the contrast enhancement device, for receiving the enhanced image, and executing a Wiener filtering of the enhanced image to obtain a filtered image;

an area detection device, coupled to the filtered image, for executing a human target detection of the filtered image based on a predetermined human characteristic to obtain each human sub-image, determining a pixel area of each human sub-image, determining an area percentage of each target based on the pixel area of each target and the total pixel area of the filtered image;

a depth-of-view detection device, coupled to the area detection device, for determining the depth of view of each target corresponding to each respective human sub-image in the filtered image, and determining the physical area of each target based on the area percentage and the depth of view of each target;

an image initial screening device, coupled to the depth-of-view detection device, for screening each target with a physical area smaller than or equal to a first area threshold in the filtered image to obtain an initially screened image;

an image re-screening device, coupled to the depth-of-view detection device, for screening each target with a physical area smaller than or equal to a second area threshold in the filtered image to obtain a re-screened image; wherein the second area threshold is greater than the first area threshold;

a target capturing device, coupled to the image initial screening device and the image re-screening device, for subtracting the initially screened image from the re-screened image to obtain a differentiated image, and outputting the human sub-image corresponding to the remaining target of the differentiated image as a final human sub-image;

a target analysis device, coupled to the target capturing device, for receiving the final human sub-image, and performing a face recognition of the final human sub-image to obtain a target face characteristic, and matching the target face characteristic with each criminal face image characteristic, wherein if there is a match, then an identification success signal will be issued, and a criminal's name corresponding to the matched criminal face image characteristic will be outputted, and the spraying direction will be determined based on a relative position of the differentiated image of the final human sub-image; and if there is no match at all, then an identification failure signal will be issued;

wherein, the master control device is coupled to the target analysis device and the pepper spray device for turning on the spray driving device and sending the spraying direction to the pepper spray device when receiving the identification success signal, and for turning off the pepper spray device when receiving the identification failure signal;

wherein, the master control device is further provided for determining the instant distance of the human target corresponding to the final human sub-image from the speaker based on the depth of view of the final human sub-image corresponding to the human target in the differentiated image and adjusting the spray intensity sent to the pepper spray device according to the instant distance, when the identification success signal is received.

The police speaker further comprises an instant display device installed in a front-end dashboard of the police car and coupled to the master control device for instantly displaying the spraying direction and the instant distance.

In the police speaker, the instant display device is further used for instantly displaying text information corresponding to the identification success signal or the identification failure signal.

The police speaker further comprises a spray head coupled to the pepper spray device for adjusting the spraying direction of the pepper spray device.

In addition, the image filtering suppresses the noise as shown in the target icon in the FIGURE while maintaining the detailed characteristics of the image as much as possible, and this is a necessary operation in an image pre-processing process, and the effect of the processing directly affects the validity and reliability of the subsequent image processing and analysis.

Due to the imperfections in imaging systems, transmission media and recording devices, the formation and transmitting process of digital images are often affected by various types of noises. In addition, noises may be introduced into the resulted image in some imaging processing cases, if the inputted image object is not as expected. These noises are often expressed in form of an isolated pixel or block of an image having a strong visual effect. In general, a noise signal appears as useless information with respect to a studied object but it will disturb the observable information of the image. Digital image signals and noises are in the maximum or minimum values, and these extremum values may cause bright or dark spots of an image and lower the image quality significantly through the addition or subtraction of these extremum values on the real grey value of the image pixel, or even affects the restoration, division, characteristic fetching, image identification of the image. It is necessary to take the following two basic factors into consideration on the effect of suppressing noises effectively: The noises in the target and background must be removed effectively. In addition, the target shape, size, and specific geometrically and topologically structural characteristics of the image must be protected properly.

One of the common image filtering modes is a nonlinear filter. In general, when a signal spectrum is aliased with a noise spectrum or a signal contains a non-aliased noise, such as the existence of a noise caused by system linearity or a non-Gaussian noise, the traditional linear filtering technology such as Fourier transform will express the image in certain fuzzy image details (such as an edge) while filtering the noise. As a result, the positioning precision and extractability of the linear characteristic of the image will be reduced. The nonlinear filter is a nonlinear mapping of the input signal and often maps a certain specific noise to zero while maintaining the desired characteristics of the signal, and thus it can overcome the deficiencies of the linear filter to a certain extent.

The universal police speaker of the present invention overcomes the technical issue of the conventional police speaker without any anti-violence operation by adding an image identification device and a pepper spray device to the conventional police speaker to achieve the effects of identifying an image of a criminal and spraying a pepper spray towards the criminal, so as to simplify a police officer's operation and fully utilize the present existing hardware resources.

While the present invention has been described by means of specific embodiments, numerous modifications and variations could be made thereto by those skilled in the art without departing from the scope and spirit of the present invention set forth in the claims.

What is claimed is:

1. A universal police speaker, comprising:

an inner cavity, a voice coil, a magnet, a support plate, a diaphragm and a protecting cover to form a dome speaker structure, and the inner cavity being filled with a sound absorbing material, the voice coil being installed around the inner cavity, the magnet being installed around the voice coil, the support plate being installed between the voice coil and the magnet, the diaphragm being installed at the top of the inner cavity, and the protecting cover being installed at the diaphragm;

wherein the universal police speaker further comprises a level bracket for placing the inner cavity, the voice coil, the magnet, the support plate, the diaphragm and the protecting cover; and the level bracket is disposed at the top of a car body of a police car;

an image capturing device installed on the level bracket for performing an image data collection of the surrounding of the police car to obtain a high-definition panoramic image;

a master control device installed in the level bracket and coupled to the dome speaker structure and the image capturing device for controlling the dome speaker structure based on the content outputted by the image capturing device;

a pepper spray, stored in the police car, for performing a fixed-direction spray;

a contrast enhancement device, coupled to the image capturing device, for receiving the high-definition panoramic image, and performing a contrast enhancement processing of the high-definition panoramic image to obtain an enhanced image;

a Wiener filtering device, coupled to the contrast enhancement device, for receiving the enhanced image, and executing a Wiener filtering of the enhanced image to obtain a filtered image;

an area detection device, coupled to the filtered image, for executing a human target detection of the filtered image based on a predetermined human characteristic to obtain each human sub-image, determining a pixel area of each human sub-image, determining an area percentage of each target based on the pixel area of each target and the total pixel area of the filtered image;

a depth-of-view detection device, coupled to the area detection device, for determining the depth of view of each target corresponding to each respective human sub-image in the filtered image, and determining the physical area of each target based on the area percentage and the depth of view of each target;

an image initial screening device, coupled to the depth-of-view detection device, for screening each target with a physical area smaller than or equal to a first area threshold in the filtered image to obtain an initially screened image;

an image re-screening device, coupled to the depth-of-view detection device, for screening each target with a physical area smaller than or equal to a second area threshold in the filtered image to obtain a re-screened image; wherein the second area threshold is greater than the first area threshold;

a target capturing device, coupled to the image initial screening device and the image re-screening device, for subtracting the initially screened image from the re-screened image to obtain a differentiated image, and outputting the human sub-image corresponding to the remaining target of the differentiated image as a final human sub-image; and a target analysis device coupled to the target capturing device for receiving the final human sub-image, and performing a face recognition of the final human sub-image to obtain a target face characteristic, and matching the target face characteristic with each criminal face image characteristic, wherein if there is a match, then an identification success signal will be issued, and a criminal's name corresponding to the matched criminal face image characteristic will be outputted, and the spraying direction will be determined based on a relative position of the differentiated image of the final human sub-image, and if there is no match at all, then an identification failure signal will be issued, wherein the master control device is coupled to the target analysis device and the pepper spray device for turning on the spray driving device and sending the spraying direction to the pepper spray device when receiving the identification success signal, and for turning off the pepper spray device when receiving the identification failure signal, and wherein the master control device is further provided for determining the instant distance of the human target corresponding to the final human sub-image from the speaker based on the depth of view of the final human sub-image corresponding to the human target in the differentiated image and adjusting the spray intensity sent to the pepper spray device according to the instant distance, when the identification success signal is received.

2. The universal police speaker according to claim 1, wherein the image capturing device comprises four image sensors embedded around the level bracket for splicing the images outputted from the four image sensors to obtain the high-definition panoramic image.

3. The universal police speaker according to claim 1, further comprising an instant display device installed in a front-end dashboard of the police car and coupled to the master control device for instantly displaying the spraying direction and the instant distance.

4. The universal police speaker according to claim 3, wherein the instant display device is further used for instantly displaying text information corresponding to the identification success signal or the identification failure signal.

5. The universal police speaker according to claim 4, further comprising a spray head coupled to the pepper spray device for adjusting the spraying direction of the pepper spray device.

* * * * *